United States Patent
Rusciano et al.

(10) Patent No.: US 12,036,996 B2
(45) Date of Patent: Jul. 16, 2024

(54) AUTOMATED METHOD TO DETECT ROAD USER FRUSTRATION DUE TO AUTONOMOUS VEHICLE DRIVING BEHAVIOR

(71) Applicant: GM Cruise Holdings LLC, San Francisco, CA (US)

(72) Inventors: Domenico Rusciano, Concord, CA (US); Jeffrey Brandon, Phoenix, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 197 days.

(21) Appl. No.: 17/557,386

(22) Filed: Dec. 21, 2021

(65) Prior Publication Data

US 2023/0192099 A1 Jun. 22, 2023

(51) Int. Cl.
*B60W 40/09* (2012.01)
*B60W 40/04* (2006.01)
*B60W 60/00* (2020.01)

(52) U.S. Cl.
CPC ............ *B60W 40/09* (2013.01); *B60W 40/04* (2013.01); *B60W 60/001* (2020.02); *B60W 2540/223* (2020.02); *B60W 2540/30* (2013.01); *B60W 2554/4026* (2020.02); *B60W 2554/4029* (2020.02)

(58) Field of Classification Search
CPC .... B60W 40/09; B60W 60/001; B60W 40/04; B60W 2554/4026; B60W 2554/4029; B60W 2540/223; B60W 2540/30
See application file for complete search history.

(56) References Cited

U.S. PATENT DOCUMENTS

| | | | |
|---|---|---|---|
| 2012/0083942 A1* | 4/2012 | Gunaratne | B60W 40/09 703/2 |
| 2016/0347309 A1* | 12/2016 | Vijayan | G08G 1/166 |
| 2016/0363935 A1* | 12/2016 | Shuster | G08G 1/0141 |
| 2017/0057507 A1* | 3/2017 | Gordon | B60W 30/16 |
| 2018/0330178 A1* | 11/2018 | el Kaliouby | B60W 50/082 |
| 2019/0005377 A1* | 1/2019 | Malaya | G06N 3/042 |

(Continued)

OTHER PUBLICATIONS

Brandon Myers, "Avoiding Road Rage: 12 Ways You Can Escape Aggressive Driving", Jan. 2021, defensivedriving.org, page instance retrieved using wayback machine. (Year: 2021).*

(Continued)

*Primary Examiner* — Hussein Elchanti
*Assistant Examiner* — Kenneth M Dunne

(57) ABSTRACT

Systems and methods are provided for detecting road user frustration such as aggressive road users and/or uncomfortable road user behavior, and evaluating autonomous vehicle driving behavior that results in the road user frustration. An autonomous vehicle fleet can leverage information about typical road user behavior to create an index measuring the frustration level of other road users and/or likeability of autonomous vehicle behavior by other road users. Additionally, perception algorithms associated with sound detection and tracking can define human characteristics associated with frustrated drivers or other road users. Autonomous vehicle performance can be improved as a result of data analysis from the behavior of other road users.

14 Claims, 6 Drawing Sheets

200

(56) References Cited

U.S. PATENT DOCUMENTS

| | | | |
|---|---|---|---|
| 2019/0009785 A1* | 1/2019 | Lawrenson | G08G 1/017 |
| 2019/0283746 A1* | 9/2019 | Shalev-Shwartz | G05D 1/0221 |
| 2020/0207358 A1* | 7/2020 | Katz | G01C 21/3697 |
| 2021/0097267 A1* | 4/2021 | Stokman | G06N 20/00 |
| 2021/0146957 A1* | 5/2021 | Kim | B60W 60/00253 |
| 2021/0354726 A1* | 11/2021 | Bill | B60W 40/09 |
| 2022/0024484 A1* | 1/2022 | Armstrong-Crews | B60W 40/02 |
| 2023/0090078 A1* | 3/2023 | Wang | G05D 1/0291 |
| | | | 701/117 |

OTHER PUBLICATIONS

U.S. Appl. No. 17/398,528, filed Aug. 10, 2021, entitled "Dangerous Road User Detection and Response," 69 pages.

* cited by examiner

400

AUTOMATED METHOD TO DETECT ROAD USER FRUSTRATION DUE TO AUTONOMOUS VEHICLE DRIVING BEHAVIOR

FIELD OF THE DISCLOSURE

The present disclosure relates generally to autonomous vehicles (AVs) and to systems and methods for detecting road user frustration due to autonomous vehicle driving behavior.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles perform many of the functions that are conventionally performed by human drivers, such as avoiding dangerous or difficult routes, and performing other navigation and routing tasks necessary to provide transportation on city and state roads with other vehicles. Autonomous vehicles may drive in traffic with human drivers, who may react to autonomous vehicle driving behavior. Currently, there is no automated system or process for determining how autonomous vehicle behavior impacts other road users.

SUMMARY

Systems and methods are provided for detecting road user frustration due to autonomous vehicle driving behavior. In particular, the autonomous vehicle stack tracks and plans other road users' speeds, locations, predicted paths, and other metrics. An autonomous vehicle fleet can leverage this information to determine typical road user behavior and to create an index measuring the frustration level of other road users and/or likeability of autonomous vehicle behavior by other road users. Additionally, perception algorithms associated with sound detection and tracking can define human characteristics associated with frustrated drivers or other road users.

According to one aspect, a method for detecting reactions to autonomous vehicle driving behavior, comprises: detecting, using autonomous vehicle perception, a reaction from a road user; analyzing a plurality of previous autonomous vehicle driving maneuvers; and identifying a first autonomous vehicle driving maneuver that caused the reaction, wherein the first autonomous vehicle driving maneuver is one of the plurality of previous autonomous vehicle driving maneuvers.

In some implementations, the method further comprises performing data analytics on other road user reactions to the first autonomous vehicle driving maneuver to determine whether the first autonomous vehicle driving maneuver causes other road user frustration. In some implementations, detecting the reaction from the road user includes detecting at least one of one of an aggressive hand gesture and an aggressive facial expression. In some implementations, detecting the reaction from the road user includes detecting at least one of erratic driving behavior and excessive honking. In some implementations, detecting the reaction from the road user includes detecting at least one of one of an aggressive hand gesture, an aggressive facial expression, and aggressive body language. In some implementations, detecting a reaction from a road user includes detecting a reaction from one of a driver, a cyclist, and a pedestrian.

In some implementations, the method further comprises adjusting autonomous vehicle driving behavior to prevent the first autonomous vehicle driving maneuver. In some implementations, the method further comprises classifying the reaction from the road user on a road user reaction index.

According to another aspect, a system for detecting reactions to autonomous vehicle driving behavior, comprises an autonomous vehicle perception system configured to detect a reaction from a road user; a computer configured to: analyze a plurality of previous autonomous vehicle driving maneuvers; and identify a first autonomous vehicle driving maneuver that caused the reaction, wherein the first autonomous vehicle driving maneuver is one of the plurality of previous autonomous vehicle driving maneuvers.

In some implementations, the computer is a central computer, and the system further comprises an autonomous vehicle onboard computer configured to transmit the reaction and the plurality of previous autonomous vehicle driving maneuvers to the central computer. In some implementations, the central computer is further configured to perform data analytics on other road user reactions to the first autonomous vehicle driving maneuver. In some implementations, the central computer is further configured to define a road user reaction index and classify the reaction from the road user using the road user reaction index. In some implementations, the central computer is further configured to analyze road user reactions to other autonomous vehicles performing the first autonomous vehicle driving maneuver. In some implementations, the central computer is further configured to adjust autonomous vehicle driving behavior to prevent the first autonomous vehicle driving maneuver.

In some implementations, the computer is an autonomous vehicle onboard computer, and wherein the autonomous vehicle onboard computer is further configured to transmit the first autonomous vehicle driving maneuver and the reaction to a central computer.

According to another aspect, a system for detecting reactions to autonomous vehicle driving behavior, comprises: a plurality of autonomous vehicles, each having a perception system to detect reactions from road users; and a central computer to: receive the reactions from road users from the plurality of autonomous vehicles; analyze the reactions; and define a road user reaction index and classify each of the reactions from the road users based on the road user reaction index.

In some implementations, the plurality of autonomous vehicles each have an onboard computer to: utilize the road user reaction index; analyze, for reactions with a selected road user reaction index classification, a plurality of previous driving maneuvers; and identify, for each reaction with the selected road user reaction index classification, a first driving maneuver that caused the respective reaction. In some implementations, for each of the plurality of autonomous vehicles, the onboard computer transmits the first driving maneuver and the respective reaction to the central computer. In some implementations, the central computer is further configured to perform data analytics on first driving maneuvers received from the plurality of autonomous vehicles and identify driving maneuvers that cause road user frustration. In some implementations, the central computer is further configured to adjust autonomous vehicle driving behavior for the plurality of autonomous vehicles to prevent the identified driving maneuvers.

According to another aspect, an autonomous vehicle for detecting reactions to autonomous vehicle driving behavior, comprises: a perception system to detect a reaction from a road user; an onboard computer to: analyze a plurality of previous autonomous vehicle driving maneuvers; and identify a first autonomous vehicle driving maneuver that caused the reaction, wherein the first autonomous vehicle driving maneuver is one of the plurality of previous autonomous vehicle driving maneuvers. In some implementations, the onboard computer further ranks the reaction from the road user based on a road user reaction index.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
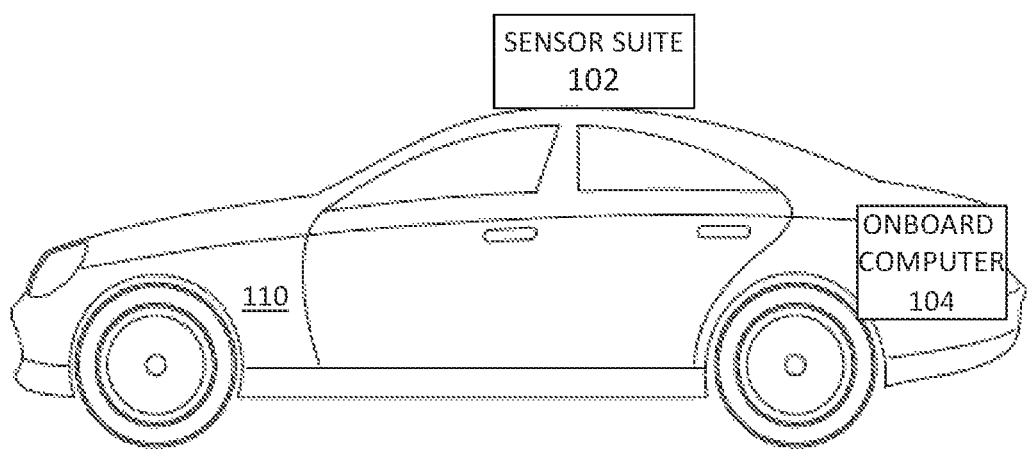
FIG. 1 is a diagram illustrating an autonomous vehicle, according to some embodiments of the disclosure.

Systems and methods are provided for detecting road user frustration due to autonomous vehicle driving behavior. In particular, the autonomous vehicle technology stack tracks and plans other road users' speeds, locations, predicted paths, and other metrics. An autonomous vehicle fleet can leverage this information to determine typical driving behavior of other road users and create an index measuring the frustration level of other road users and/or likeability of autonomous vehicle behavior by other road users. Additionally, perception algorithms associated with sound detection and tracking can define human characteristics associated with frustrated drivers or other road users.

Determining how autonomous vehicle behavior impacts other road users allows for modification of autonomous vehicle behavior to improve likeability of autonomous vehicles and decrease any frustration autonomous vehicle driving behavior may cause to other road users. Since different markets have different driving styles, for example due to cultural and local differences, a system to evaluate road user reactions to autonomous vehicles can be used to adjust autonomous vehicle driving behavior for different markets.

In some implementations, systems and methods are provided for real-time detection and communication of aggressive road users and/or uncomfortable road user behavior to an operations center. In some examples, identifying aggressive road users and/or identifying uncomfortable road user behavior can include detection of aggressive hand gestures, facial expressions, or other body language using autonomous vehicle perception. In some examples, identifying aggressive road users and/or identifying uncomfortable road user behavior can include detection of erratic or uncomfortable road user behavior using autonomous vehicle perception. Additionally, in some examples, identifying aggressive road users and/or identifying uncomfortable road user behavior can include identifying excessive sound profiles such as other road users' honking behaviors. Road users can include pedestrians, cyclists, scooter riders, motorcyclists, automobile drivers, and any other people on the road. In various implementations, data analytics of other road users' level of frustration can be used to evaluate autonomous vehicle behavior that results in the frustration. In some examples, data analytics of other road users' aggressive or uncomfortable driving can be used to detect other users' frustration and evaluate autonomous vehicle behavior that results in the frustration. Additionally, autonomous vehicle performance can be improved as a result of the data analysis from the behavior of other road users.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Detecting Road User Frustration

FIG. 1 is a diagram of an autonomous driving system 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. The autonomous vehicle 110 can also use information from the sensor suite 102 to detect road user frustration of human road users such as drivers, cyclists, and pedestrians. According to various implementations, the autonomous vehicle 110 is part of a fleet of vehicles for picking up passengers and/or packages and driving to selected destinations.

The sensor suite 102 includes localization and driving sensors. For example, the sensor suite may include one or more of photodetectors, cameras, radio detection and ranging (RADAR), SONAR, light detection and ranging (LIDAR), GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In some examples, data from the sensor suite 102 can provide localized traffic information. In this way, sensor suite 102 data from many autonomous vehicles can continually provide feedback to the mapping system and the high fidelity map can be updated as more and more information is gathered. Additionally, in various implementations, sensor suite 102 data includes data about other road users in the vicinity of the autonomous vehicle 110, such as road user location and speed. In various examples, sensor suite 102 data includes data about vehicle operators, such as drivers and cyclists, such as hand gestures or other body language. Furthermore, in some examples, the sensor suite 102 includes microphones that can detect sounds such as honking or yelling. In some examples, the sensor suite 102 includes an infrared sensor, which can be used to detect body temperature of other road users and change in body temperature in other road users. In some instances, road user frustration and/or aggravation can result in an increase in body temperature of the road user, which can be detected by an infrared sensor.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. Additionally, in various examples, the onboard computer 104 can evaluate sensor suite 102 data on other road users and identify road user frustration. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

In various implementations, the autonomous vehicle includes an autonomous vehicle technology stack, which includes autonomous vehicle sensors including sensors in the sensor suite 102, and the onboard computer 104. The autonomous vehicle technology stack tracks and plans other road users' speeds, locations, predicted paths, and other metrics. In various examples, the autonomous vehicle technology stack includes software on the onboard computer 104 that tracks other road users and detects road user frustration and/or aggravation. Additionally, the onboard computer 104 can include software that analyzes autonomous vehicle 110 maneuvers. In some examples, the software on the onboard computer 104 includes machine learning software. In some implementations, an autonomous vehicle technology stack includes an interface with a central computer with which the autonomous vehicle 110 communicates, as described in greater detail with respect to FIG. 5.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Detecting Road User Frustration

Figure 2:
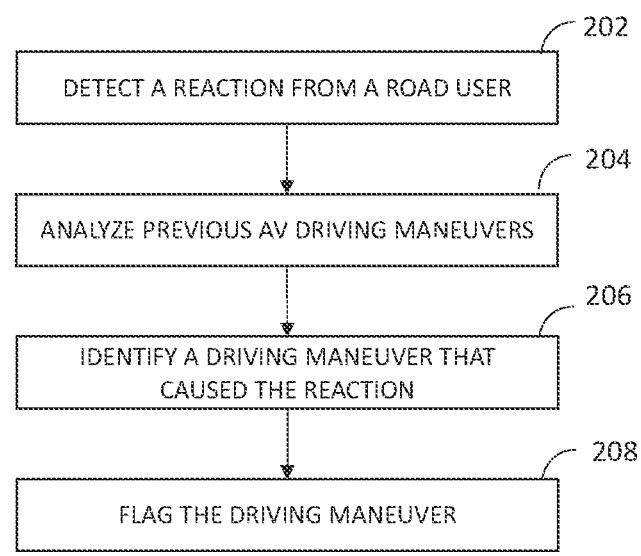
FIG. 2 is a flowchart illustrating a method for an autonomous vehicle to detect a reaction from another road user, according to some embodiments of the disclosure.

FIG. 2 is a flowchart illustrating a method 200 for an autonomous vehicle to detect a reaction from another road user, according to some embodiments of the disclosure. In particular, the method 200 can be used to detect road user frustration and identify an autonomous vehicle behavior that caused the road user frustration. In some examples, autonomous vehicles in an autonomous vehicle fleet can use the method 200 to identify autonomous vehicle behaviors that frustrate other road users, and the driving behavior of the autonomous vehicles in an autonomous vehicle fleet can be adjusted to decrease the frustration of other road users.

At step 202, a reaction from a road user is detected by an autonomous vehicle. In particular, in various examples, an autonomous vehicle can leverage its perception information to identify a reaction from another road user. In some examples, reactions from more than one other road user are detected. In some examples, an autonomous vehicle can detect aggressive hand gestures, facial expressions, or other body language. In various examples, facial expressions can be identified without facial recognition. An aggressive facial expression can include an angry facial expression, or a facial expression indicating a person is yelling. An aggressive hand gesture can include holding up a middle finger (also known as "flipping the bird"), holding up two fingers and moving the hand inward and outward at the wrist, and holding up an arm with the front of the hand towards the face. According to some implementations, machine learning models are used to identify hand gestures that signify aggravation or frustration. Similarly, in some implementations, machine learning models are used to identify facial expressions that signify aggravation or frustration.

In some examples, an autonomous vehicle can detect erratic or uncomfortable road user behavior, including pedestrian behavior, cyclist behavior, and automobile driver behavior. In some examples, erratic or uncomfortable behavior includes aggressive driving maneuvers. In some examples, erratic or uncomfortable behavior includes a speed profile that exceeds a selected threshold. The threshold can depend on the particular market and/or operational city, and the selected threshold can be a "due care" threshold for pedestrians, cyclists, and motor vehicles in the particular market. In some examples, erratic and/or uncomfortable behavior includes a distance profile that exceeds a selected threshold. For instance, a distance profile may exceed a selected threshold if another road user is driving very close to the autonomous vehicle and/or tailgating the autonomous vehicle.

Additionally, in some examples, an autonomous vehicle can detect excessive sound profiles such as other road users' honking and/or yelling. In some examples, autonomous vehicle microphones identify horn usage from surrounding drivers. In some examples, autonomous vehicle microphones are used to identify the vehicle or vehicles honking their horns. Additionally, using various microphones, the autonomous vehicle can determine directionality of detected honking, thereby determining whether horn usage is directed at the autonomous vehicle or at a different vehicle. In some examples, using one or more infrared sensors, the autonomous vehicle can detect body temperature of other road users and change in body temperature in other road users. In some instances, road user frustration and/or aggravation can result in an increase in body temperature of the road user, which can be detected using one or more infrared sensors.

In various implementations, the autonomous vehicle sensor suite and/or other sensors on the autonomous vehicle detect the other road user reactions, and an autonomous vehicle onboard computer analyzes the detected road user reaction. In particular, the autonomous vehicle onboard computer can leverage its perception information to identify aggressive reactions and/or frustrated reactions from other road users. In some examples, overtime, data analytics of other road users' frustration can be used to evaluate autonomous vehicle behavior that results in the frustration. In particular, data analytics refers to analyzing data over time, and data analytics can reveal specific autonomous vehicle maneuvers that frequently cause other road users frustration.

When an aggressive reaction and/or frustrated reaction from another road user is detected at step 202, at step 204, the previous driving maneuvers of the autonomous vehicle are analyzed. In particular, the autonomous vehicle's previous driving maneuvers are analyzed to identify a driving maneuver that caused the reaction. In some examples, the locations of the autonomous vehicle's previous driving maneuvers are analyzed to determine whether the location of the driving maneuver caused the reaction. For instance, if an autonomous vehicle stops to drop off a passenger or package in a location where the vehicle is not visible to other drivers turning a corner, the location of the stop may cause other road user frustration, not the stop itself.

In some examples, driving maneuvers that occurred over a select period of time before the detected reaction are analyzed. For instance, driving maneuvers that occurred during the few seconds before the detected reaction may be analyzed. In some examples, a few seconds includes between about two seconds and about five seconds before the detected reaction. In various examples, a machine learning program analyzes the previous autonomous vehicle driving maneuvers. For example, software on the autonomous vehicle can analyze the previous driving maneuvers of the autonomous vehicle. In some examples, the previous driving maneuvers of the autonomous vehicle are transmitted to a central computer, which analyzes the previous driving maneuvers. In some examples, a person analyzes the previous autonomous vehicle driving maneuvers.

At step 206, the driving maneuver that caused the reaction is identified. In some examples, a machine learning algorithm is used to identify the driving maneuver. For instance, software on the autonomous vehicle can analyze the previous driving maneuvers and identify the driving maneuver that caused the reaction. In some examples, the previous driving maneuvers of the autonomous vehicle are transmitted to a central computer, which identifies the driving maneuver that caused the detected reaction. In some examples, a person may review the autonomous vehicle maneuvers sent to the central computer and the person may identify the maneuver that caused the detected reaction.

At step 208, the identified driving maneuver is flagged. In some examples, when the driving maneuver is identified by the autonomous vehicle, the flagged driving maneuver is transmitted to a central computer. In some examples, the autonomous vehicle avoids flagged driving maneuvers. In various examples, machine learning algorithms on the autonomous vehicle learn to avoid the flagged driving maneuver and identify an alternative to the flagged driving maneuver, where the alternative driving maneuver does not cause an aggressive reaction or a frustrated reaction from other road users. In some examples, machine learning algorithms at a central computer identify an alternative to the flagged driving maneuver, and transmit the alternative driving maneuver information to the autonomous vehicle.

Figure 3:
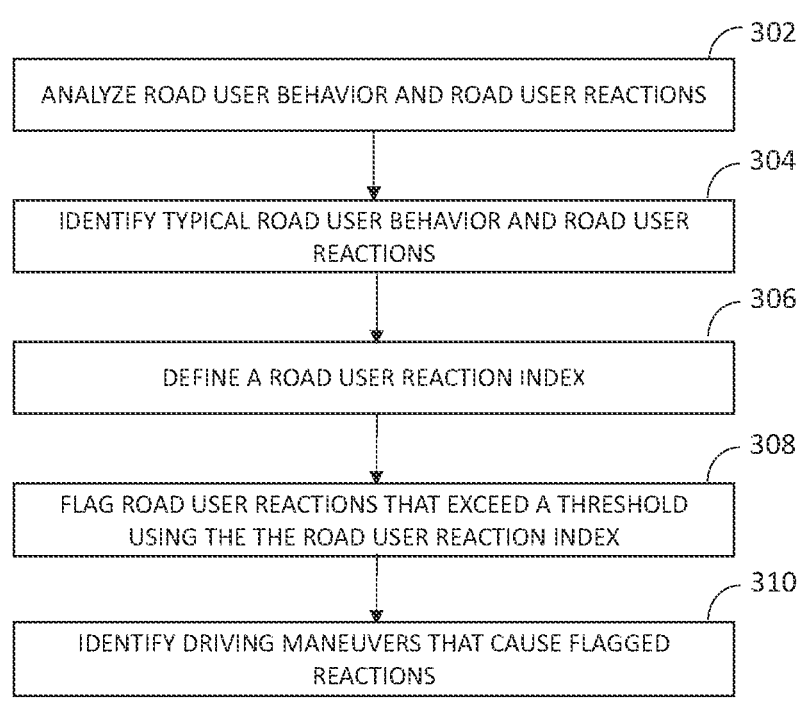
FIG. 3 is a flowchart illustrating a method for an autonomous vehicle fleet service to detect reactions from other road users to autonomous vehicles in the fleet, according to some embodiments of the disclosure.

FIG. 3 is a flowchart illustrating a method 300 for an autonomous vehicle fleet service to detect reactions from other road users to autonomous vehicles in the fleet, according to some embodiments of the disclosure. In particular, the method 300 can be used to detect road user reactions and define a road user frustration index. The road user frustration index can be used to classify and/or rank road user reactions, and flag reactions that exceed a certain threshold. Then, autonomous vehicle maneuvers that cause road user frustration can be identified. In some examples, autonomous vehicles in an autonomous vehicle fleet can use the method 300 to identify autonomous vehicle behaviors that frustrate other road users, and the driving behavior of the autonomous vehicles in an autonomous vehicle fleet can be adjusted to decrease road user frustration and increase the likeability of the autonomous vehicle fleet.

At step 302, road user behavior and road user reactions are analyzed. In particular, the behavior and reactions of human road users to various autonomous vehicles in an autonomous vehicle fleet are analyzed. Road user behavior that can be analyzed can include road user vehicle speeds, distances between vehicles, distances maintained by human road users behind autonomous vehicles, and honking behavior. Other road user behavior that can be analyzed for drivers, cyclists, pedestrians, and other road users includes hand gestures, body language, and facial expressions. In various examples, road user behavior and road user reactions can be analyzed at an autonomous vehicle onboard computer. In some examples, road user behavior and road user reactions can be analyzed at a central computer.

At step 304, based on the road user behavior and reactions analyzed in step 302, typical road user behavior and road user reactions are identified. In particular, road user behavior and road user reactions analyzed at step 302 can be categorized and/or ranked to identify reactions that are typical versus reactions that indicate frustration and/or aggravation. In various examples, collected road user reaction data is analyzed (data analytics) and then categorized and/or ranked. For example, a short honk may be used to get someone's attention without indicating frustration, while a longer honk can indicate driver frustration. In another example, in some instances, a hand wave can be a general gesticulation of a driver conversing with a passenger in their vehicle, or can be used to indicate to a pedestrian to cross in front of the car. In other instances, a hand wave in a different direction (e.g., front-to-back as opposed to side-to-side) and of a different speed can be used to indicate frustration.

At step 306, a road user reaction index can be defined that categorizes and/or classifies road user behavior and reactions on a scale that ranges from calm to extremely frustrated. In one example, the road user reaction index can be a ten-level scale that rates recorded reactions on a scale from one (calm) to ten (extremely frustrated).

At step 308, the road user reaction index can be used to rank road user reactions and flag road user reactions that exceed a selected threshold. In one example, road user reactions that exceed a seven or eight on the road user reaction index can be flagged. Then, for the flagged reactions, at step 310, autonomous vehicle maneuvers prior to the flagged reaction can be analyzed to identify an autonomous vehicle maneuver that caused the road user reaction. In various implementations, once the autonomous vehicle maneuver that caused the road user reaction is identified, the autonomous vehicle behavior can be modified across the autonomous vehicle fleet to modify or avoid the particular maneuver.

According to various implementations, the method 300 can be used to adjust autonomous vehicle driving behavior across a fleet of autonomous vehicles. For example, autonomous vehicle driving maneuvers that frequently result in a road user reaction that exceeds a selected threshold can be identified and adjusted. In some examples, one or more parameters of an autonomous vehicle driving maneuver can be modified. According to various implementations, over time, as more autonomous vehicle driving maneuvers that cause road user frustration are identified, autonomous vehicle driving behavior across the fleet can be adjusted to result in autonomous vehicle driving behavior that is more likable to other road users and results in minimal road user frustration.

In some implementations, autonomous vehicle behavior and/or autonomous vehicle maneuvers are tested and refined using simulation software. In various examples, other road user frustration can be added to simulation programs to teach autonomous vehicles to recognize other road user frustration. In particular, simulation events can be generated that result in aggressive behavior by other road users. In some examples, in an autonomous vehicle simulation, when an autonomous vehicle performs a selected maneuver in a selected scenario, other road users in the simulation can react with frustration. In various examples, simulations can be designed to include other road user behavior and other road user reactions that indicate other road user frustration and/or aggravation.

Example System for Detection of Road User Frustration

Figure 4:
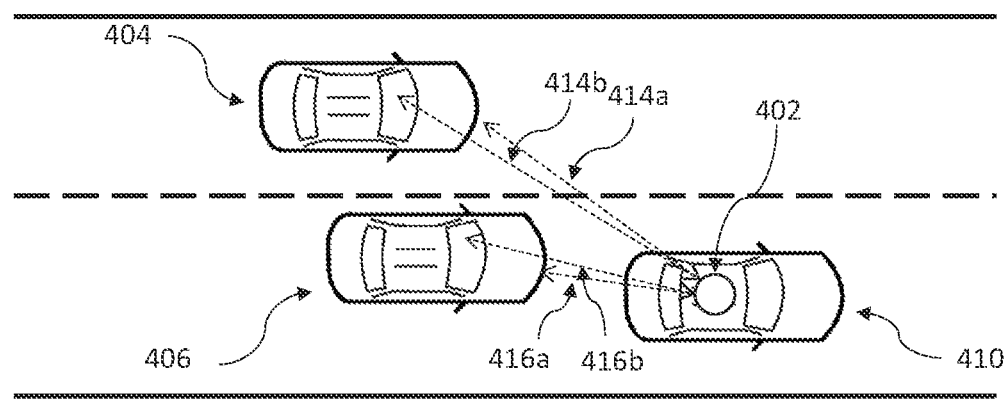
FIG. 4 is a diagram illustrating an autonomous vehicle monitoring other road users, according to some embodiments of the disclosure.

FIG. 4 is a diagram illustrating an autonomous vehicle 410 monitoring other road users, according to various embodiments of the disclosure. In particular, an autonomous vehicle 410 is illustrated on a road with a first vehicle 404 driven by a first road user and a second vehicle 406 driven by a second road user. The autonomous vehicle 410 has a sensor suite 402 that monitors vehicles in its vicinity, including the first 404 and second 406 vehicles. As shown by the lines of sight 414a, 414b in FIG. 4, the sensor suite 402 detects behavior of the first vehicle 404, and the sensor suite 402 also detects behavior of a first road user who is driving the first vehicle 404. Similarly, as shown by the lines of sight 416a, 416b in FIG. 4, the sensor suite 402 detects behavior of the second vehicle 406 and the sensor suite 402 also detects behavior of a second road user who is driving the second vehicle 406. In various examples, the autonomous vehicle 410 can implement the method 200 of FIG. 2. In various examples, the autonomous vehicle 410 can detect road user frustration from the first and/or second road users.

In one example, the sensor suite 402 detects the distance between the autonomous vehicle 410 and the second vehicle 406, and the sensor suite 402 may determine that the distance between the autonomous vehicle 410 and the second vehicle 406 is shorter than a typical distance between vehicles. In various examples, when the second vehicle 406 follows a short distance behind the autonomous vehicle 410, this can be an indication of road user frustration. In some examples, the sensor suite 402 may detect a road user reaction for the second road user using the line of sight 416b, and the road user reaction may indicate road user frustration. For example, the road user reaction of the second road user may be ranked on a road user reaction index as described above, and the road user reaction may exceed a threshold.

Figure 5:
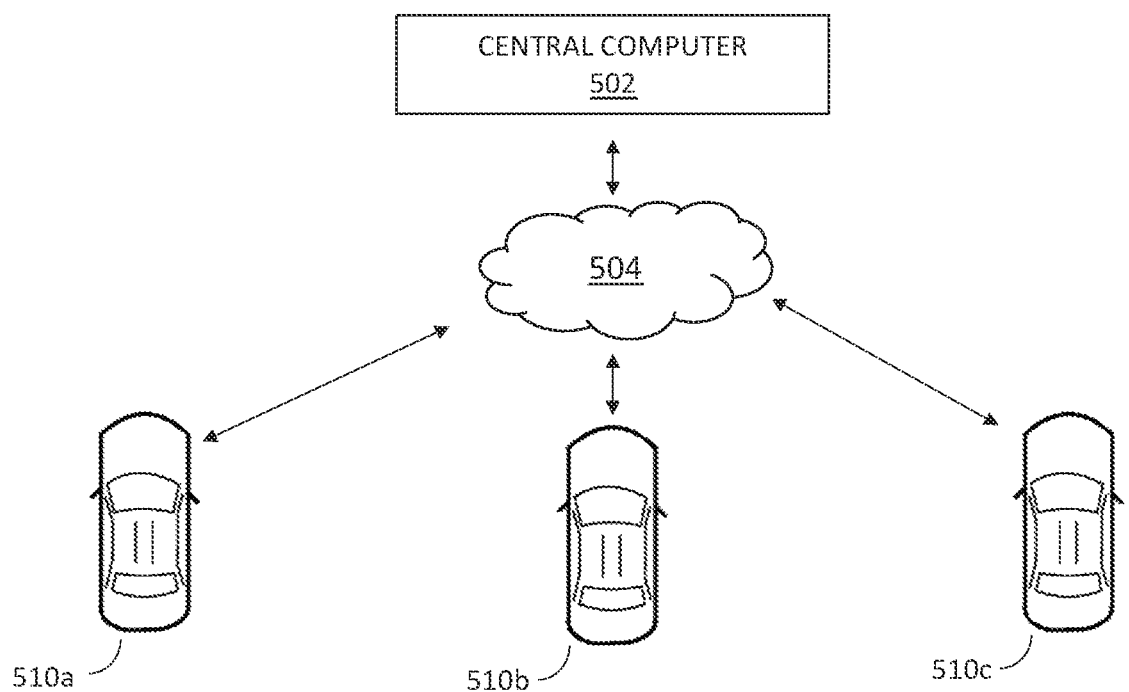
FIG. 5 is a diagram illustrating a central computer in communication with a cloud and multiple autonomous vehicles, according to some embodiments of the disclosure.

FIG. 5 is a diagram 500 illustrating a central computer 502 in communication with a cloud 504 and multiple autonomous vehicles 510a-510c, according to some embodiments of the disclosure. In various examples, the autonomous vehicles 510a-510c are part of an autonomous vehicle fleet, and road user reactions to the autonomous vehicles 510a-510c can be analyzed by the central computer 502 to develop a road user reaction index as described above with respect to FIG. 3 and the method 300.

In some examples, the central computer 502 includes a routing coordinator and a database of information. The central computer 502 also receives information regarding other road user reactions from the autonomous vehicles 510a-510c. In some examples, the central computer 502 analyzes information received from the autonomous vehicles 510a-510c and identifies typical road user reactions. In some examples, the central computer 502 receives information from the autonomous vehicles 510a-510c regarding one or more autonomous vehicle maneuvers that an autonomous vehicle 510a-510c identified as having resulted in road user frustration. The central computer 502 can also act as a centralized ride management system and communicates with a ridehail service to fulfill ride requests. In various implementations, the central computer 502 can send ride and/or routing instructions to autonomous vehicles 510a-510c in a fleet of autonomous vehicles, as described below.

As shown in FIG. 5, the vehicles 510a-510c communicate wirelessly with a cloud 504 and the central computer 502. The central computer 502 includes a routing coordinator and a database of information from the vehicles 510a-510c in the fleet. The database of information can include road user reactions, and the database of information can include autonomous vehicle maneuvers that caused road user frustration. In some implementations, the autonomous vehicles 510a-510c communicate directly with each other.

In some examples, when a ride request is received by the central computer 502, the vehicle 510a-510c to fulfill the request is selected and a route for the vehicle 510a-510c is generated by the routing coordinator. In other examples, the routing coordinator provides the vehicle 510a-510c with a set of parameters and the vehicle 510a-510c generates an individualized specific route. The generated route includes a route from the autonomous vehicle's 510a-510c present location to the pick-up location, and a route from the pick-up location to the drop-off location. In some examples, each of the autonomous vehicles 510a-510c in the fleet is equipped to analyze road user behavior and road user reactions of other road users. In some examples, each of the autonomous vehicles 510a-510c in the fleet is equipped to identify road user frustration and/or to rank a road user reaction on a road user reaction index and determine if a road user reaction exceeded a threshold. In various examples, the vehicles 510a-510c communicate with the central computer 502 via a cloud 504.

As described above, each vehicle 510a-510c in the fleet of vehicles communicates with a routing coordinator. Thus, information gathered by various autonomous vehicles 510a-510c in the fleet can be saved and used to generate information for future routing determinations. Similarly, information gathered by various autonomous vehicles 510a-510c in the fleet can be saved and used to generate a road user reaction index. In some examples, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals.

According to various implementations, a set of parameters can be established that determine which metrics are considered (and to what extent) in determining routes or route modifications from a pick-up location to a drop-off location. For example, expected congestion or traffic based on a known event can be considered. Generally, a routing goal refers to, but is not limited to, one or more desired attributes of a routing plan indicated by at least one of an administrator of a routing server and a user of the autonomous vehicle.

Routing goals may be specific or general in terms of both the vehicles they are applied to and over what timeframe they are applied. In some examples, a routing goal may include avoiding a selected area where a high degree of other road user frustration has been detected, in order to decrease further road user frustration with autonomous vehicles in a fleet and thereby increase likeability of the autonomous vehicle fleet. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, toll cost, etc. In examples where vehicle demand is important, routing goals may include attempting to address or meet vehicle demand. Routing goals may also include minimizing other road user frustration.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

The routing coordinator uses maps to select an autonomous vehicle from the fleet to fulfill a ride request. In some implementations, the routing coordinator sends the selected autonomous vehicle the ride request details, including pick-up location and drop-off location, and an onboard computer on the selected autonomous vehicle generates a route and navigates to the destination. In some implementations, the routing coordinator in the central computer 502 generates a route for each selected autonomous vehicle 510a-510c, and the routing coordinator determines a route for the autonomous vehicle 510a-510c to travel from the autonomous vehicle's current location to a first destination.

Example of a Computing System for Ride Requests

Figure 6:
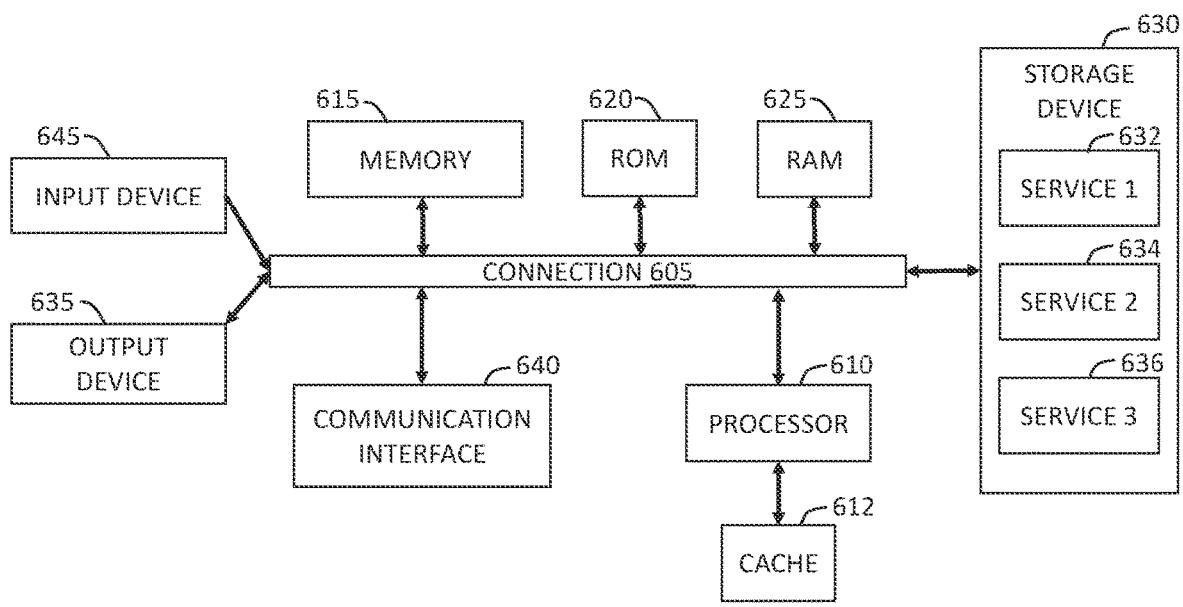
FIG. 6 shows an example embodiment of a system for implementing certain aspects of the present technology.

FIG. 6 shows an example embodiment of a computing system 600 for implementing certain aspects of the present technology. In various examples, the computing system 600 can be any computing device making up the onboard computer 104, the central computer 502, or any other computing system described herein. The computing system 600 can include any component of a computing system described herein which the components of the system are in communication with each other using connection 605. The connection 605 can be a physical connection via a bus, or a direct connection into processor 610, such as in a chipset architecture. The connection 605 can also be a virtual connection, networked connection, or logical connection.

In some implementations, the computing system 600 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 600 includes at least one processing unit, e.g., a central processing unit (CPU), or a processor, 610 and a connection 605 that couples various system components including system memory 615, such as read-only memory (ROM) 620 and random access memory (RAM) 625 to processor 610. The computing system 600 can include a cache of high-speed memory 612 connected directly with, in close proximity to, or integrated as part of the processor 610.

The processor 610 can include any general-purpose processor and a hardware service or software service, such as services 632, 634, and 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction, the computing system 600 includes an input device 645, which can represent any number of input mechanisms, such as a microphone for speech, a touch-sensitive screen for gesture or graphical input, keyboard, mouse, motion input, speech, etc. The computing system 600 can also include an output device 635, which can be one or more of a number of output mechanisms known to those of skill in the art. In some instances, multimodal systems can enable a user to provide multiple types of input/output to communicate with the computing system 600. The computing system 600 can include a communications interface 640, which can generally govern and manage the user input and system output. There is no restriction on operating on any particular hardware arrangement, and therefore the basic features here may easily be substituted for improved hardware or firmware arrangements as they are developed.

A storage device 630 can be a non-volatile memory device and can be a hard disk or other types of computer readable media which can store data that are accessible by a computer, such as magnetic cassettes, flash memory cards, solid state memory devices, digital versatile disks, cartridges, RAMs, ROM, and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer readable medium in connection with the necessary hardware components, such as a processor 610, a connection 605, an output device 635, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an Internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for detecting reactions to autonomous vehicle driving behavior, comprising: detecting, using autonomous vehicle perception, a reaction from a road user; analyzing a plurality of previous autonomous vehicle driving maneuvers; and identifying a first autonomous vehicle driving maneuver that caused the reaction, wherein the first autonomous vehicle driving maneuver is one of the plurality of previous autonomous vehicle driving maneuvers.

Example 2 provides a method according to one or more of the preceding and/or following examples, further comprising performing data analytics on other road user reactions to the first autonomous vehicle driving maneuver to determine whether the first autonomous vehicle driving maneuver causes other road user frustration.

Example 3 provides a method according to one or more of the preceding and/or following examples, wherein detecting the reaction from the road user includes detecting at least one of one of an aggressive hand gesture and an aggressive facial expression.

Example 4 provides a method according to one or more of the preceding and/or following examples, wherein detecting the reaction from the road user includes detecting at least one of erratic driving behavior and excessive honking.

Example 5 provides a method according to one or more of the preceding and/or following examples, wherein detecting a reaction from a road user includes detecting a reaction from one of a driver, a cyclist, and a pedestrian.

Example 6 provides a method according to one or more of the preceding and/or following examples, further comprising adjusting autonomous vehicle driving behavior to prevent the first autonomous vehicle driving maneuver.

Example 7 provides a method according to one or more of the preceding and/or following examples, wherein detecting the reaction from the road user includes detecting at least one of one of an aggressive hand gesture, an aggressive facial expression, and aggressive body language.

Example 8 provides a method according to one or more of the preceding and/or following examples, further comprising classifying the reaction from the road user on a road user reaction index.

Example 9 provides a system for detecting reactions to autonomous vehicle driving behavior, comprising: an autonomous vehicle perception system configured to detect a reaction from a road user; a computer configured to: analyze a plurality of previous autonomous vehicle driving maneuvers; and identify a first autonomous vehicle driving maneuver that caused the reaction, wherein the first autonomous vehicle driving maneuver is one of the plurality of previous autonomous vehicle driving maneuvers.

Example 10 provides a system according to one or more of the preceding and/or following examples, wherein the computer is a central computer, and further comprising an autonomous vehicle onboard computer configured to transmit the reaction and the plurality of previous autonomous vehicle driving maneuvers to the central computer.

Example 11 provides a system according to one or more of the preceding and/or following examples, wherein the central computer is further configured to perform data analytics on other road user reactions to the first autonomous vehicle driving maneuver.

Example 12 provides a system according to one or more of the preceding and/or following examples, wherein the central computer is further configured to define a road user reaction index and classify the reaction from the road user using the road user reaction index.

Example 13 provides a system according to one or more of the preceding and/or following examples, wherein the central computer is further configured to analyze road user reactions to other autonomous vehicles performing the first autonomous vehicle driving maneuver.

Example 14 provides a system according to one or more of the preceding and/or following examples, wherein the central computer is further configured to adjust autonomous vehicle driving behavior to prevent the first autonomous vehicle driving maneuver.

Example 15 provides a system according to one or more of the preceding and/or following examples, wherein the computer is an autonomous vehicle onboard computer, and wherein the autonomous vehicle onboard computer is further configured to transmit the first autonomous vehicle driving maneuver and the reaction to a central computer.

Example 16 provides a system for detecting reactions to autonomous vehicle driving behavior, comprising: a plurality of autonomous vehicles, each having a perception system to detect reactions from road users; and a central computer to: receive the reactions from road users from the plurality of autonomous vehicles; analyze the reactions; and define a road user reaction index and classify each of the reactions from the road users based on the road user reaction index.

Example 17 provides a system for detecting reactions to autonomous vehicle driving behavior, comprising: a central computer to: receive reactions from road users from a plurality of autonomous vehicles; analyze the reactions; and define a road user reaction index and classify each of the reactions from the road users based on the road user reaction index.

Example 18 provides a system according to one or more of the preceding and/or following examples, wherein the plurality of autonomous vehicles each have an onboard computer to: utilize the road user reaction index; analyze, for reactions with a selected road user reaction index classification, a plurality of previous driving maneuvers; and identify, for each reaction with the selected road user reaction index classification, a first driving maneuver that caused the respective reaction.

Example 19 provides a system according to one or more of the preceding and/or following examples, wherein, for each of the plurality of autonomous vehicles, the onboard computer transmits the first driving maneuver and the respective reaction to the central computer.

Example 20 provides a system according to one or more of the preceding and/or following examples, wherein the central computer is further configured to perform data analytics on first driving maneuvers received from the plurality of autonomous vehicles and identify driving maneuvers that cause road user frustration.

Example 21 provides a system according to one or more of the preceding and/or following examples, wherein the central computer is further configured to adjust autonomous vehicle driving behavior for the plurality of autonomous vehicles to prevent the identified driving maneuvers.

Example 22 provides an autonomous vehicle for detecting reactions to autonomous vehicle driving behavior, comprising: a perception system to detect a reaction from a road user; an onboard computer to: analyze a plurality of previous autonomous vehicle driving maneuvers; and identify a first autonomous vehicle driving maneuver that caused the reaction, wherein the first autonomous vehicle driving maneuver is one of the plurality of previous autonomous vehicle driving maneuvers.

Example 23 provides an autonomous vehicle according to one or more of the preceding and/or following examples, wherein the onboard computer further ranks the reaction from the road user based on a road user reaction index.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, may be embodied in various manners (e.g., as a method, a system, a computer program product, or a computer readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, or one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for detecting reactions to autonomous vehicle driving behavior, comprising:
    receiving, at an onboard computer on an autonomous vehicle, sensor data from external sensors on the autonomous vehicle, wherein the external sensors include a camera and a microphone;
    detecting, based on the sensor data, using an autonomous vehicle perception machine learning model, a reaction from an other road user, wherein the reaction indicates frustration;
    analyzing a plurality of previous driving maneuvers of the autonomous vehicle, including a location of each of the plurality of previous driving maneuvers;
    identifying a first driving maneuver that caused the reaction, wherein the first driving maneuver is one of the plurality of previous driving maneuvers;
    transmitting, by the onboard computer on the autonomous vehicle, the reaction and the plurality of previous driving maneuvers to a central computer;
    performing data analytics on other road user reactions to the first driving maneuver;
    identifying the respective location of the first driving maneuver;
    determining that the respective location caused the reaction; and
    adjusting autonomous vehicle driving behavior to prevent the autonomous vehicle from repeating the first driving maneuver.

2. The method of claim 1, wherein the performing data analytics on the other road user reactions to the first driving maneuver includes determining whether the first driving maneuver causes other road user frustration.

3. The method of claim 1, wherein detecting a reaction from a road user includes detecting a reaction from one of a driver, a cyclist, and a pedestrian.

4. The method of claim 1, wherein detecting the reaction from the other road user includes detecting erratic driving behavior.

5. The method of claim 1, wherein detecting the reaction from the other road user includes detecting at least one of one of an aggressive hand gesture, an aggressive facial expression, and aggressive body language.

6. The method of claim 1, wherein detecting the reaction from the road other user includes detecting excessive honking.

7. The method of claim 1, further comprising classifying the reaction from the other road user on a road user reaction index.

8. A system for detecting reactions to autonomous vehicle driving behavior, comprising:
    a plurality of external sensors on an autonomous vehicle, including a camera and a microphone, wherein the plurality of external sensors generate sensor data;
    an autonomous vehicle perception system to detect a reaction from a road user, wherein the reaction indicates frustration;
    a central computer to:
        analyze a plurality of previous driving maneuvers of the autonomous vehicle, including a location of each of the plurality of previous driving maneuvers,
        identify a first driving maneuver that caused the reaction, wherein the first driving maneuver is one of the plurality of previous driving maneuvers,
        adjust autonomous vehicle driving behavior to prevent the autonomous vehicle from repeating the first driving maneuver, perform data analytics on other road user reactions to the first driving maneuver, identify the respective location of the first driving maneuver, and determine that the respective location caused the reaction; and an autonomous vehicle onboard computer to transmit the reaction and the plurality of previous driving maneuvers to the central computer.

9. The system of claim 8, wherein the central computer is further to: define a road user reaction index and classify the reaction from the road user using the road user reaction index.

10. The system of claim 9, wherein the road user reaction index is a scale that ranges from calm to extremely frustrated.

11. The system of claim 8, wherein the central computer is further to analyze road user reactions to other autonomous vehicles performing the first driving maneuver.

12. A system for detecting reactions to autonomous vehicle driving behavior, comprising:

a plurality of autonomous vehicles, each configured to:
generate sensor data from vehicle sensors, and
detect reactions from other road users;

wherein the plurality of autonomous vehicles each have an onboard computer to:
utilize a road user reaction index,
analyze, for reactions with a selected road user reaction index classification, a plurality of previous driving maneuvers, identify, for each reaction with the selected road user reaction index classification, a first driving maneuver that caused the respective reaction and identify the respective location of the first driving maneuver, and determine, for each reaction, that the respective location caused the respective reaction; and the central computer to:
receive the reactions from road users and the first driving maneuvers from the plurality of autonomous vehicles;
analyze the reactions;
perform data analytics on other road user reactions to the first driving maneuvers;
define the road user reaction index and classify each of the reactions from the road users based on the road user reaction index; and
adjust autonomous vehicle driving behavior for the plurality of autonomous vehicles based on the road user reaction index.

13. The system of claim 12, wherein the data analytics on the first driving maneuvers received from the plurality of autonomous vehicles includes identifying driving maneuvers that cause road user frustration.

14. The system of claim 13, wherein the central computer is further to adjust autonomous vehicle driving behavior for the plurality of autonomous vehicles to prevent the identified driving maneuvers.

* * * * *